United States Patent
Coffy et al.

(10) Patent No.: US 8,585,092 B2
(45) Date of Patent: Nov. 19, 2013

(54) LOW FRICTION APPARATUS (LFA)

(76) Inventors: Emmanuel Coffy, Morganville, NJ (US); John J Delatush, Freehold, NJ (US)

(*) Notice: Subject to any disclaimer, the term of this patent is extended or adjusted under 35 U.S.C. 154(b) by 835 days.

(21) Appl. No.: 12/456,913

(22) Filed: Jun. 24, 2009

(65) Prior Publication Data

US 2010/0329834 A1 Dec. 30, 2010

(51) Int. Cl.
  B62B 13/00 (2006.01)
  B62B 15/00 (2006.01)
  B62B 17/00 (2006.01)
  A47B 91/00 (2006.01)
  A47B 91/04 (2006.01)
  A47B 91/06 (2006.01)

(52) U.S. Cl.
  CPC .......... *B62B 13/00* (2013.01); *B62B 15/00* (2013.01); *B62B 17/00* (2013.01); *B62B 2202/30* (2013.01); *A47B 91/04* (2013.01); *A47B 91/06* (2013.01)
  USPC ...................................... 280/845; 16/42 R

(58) Field of Classification Search
  CPC ............ C10M 103/00; C10M 125/14; C10M 125/16; C10M 173/00; C10M 173/02; F16C 29/02; F16C 32/06; F16C 33/00; F16C 33/02; F16C 33/10; F16C 33/12; F16C 33/20; F16C 35/02; B23Q 1/38; B23Q 1/25; B62B 13/00; B62B 15/00; B62B 17/00; B62B 17/06; B62B 17/062; B62B 2203/00; B62B 2203/07; B62B 2203/073; B62B 2205/30
  USPC ....... 16/136, 42, 42 R; 104/136, 279; 193/41, 193/44; 248/346.11, 687, 916; 384/25, 907; 414/800, 816; 280/845
  See application file for complete search history.

(56) References Cited

U.S. PATENT DOCUMENTS

| | | | | |
|---|---|---|---|---|
| 780,049 | A * | 1/1905 | Maguire | 104/63 |
| 1,238,431 | A * | 8/1917 | Nylund | 104/136 |
| 3,183,545 | A * | 5/1965 | Bergstrom | 16/42 R |
| 3,343,495 | A * | 9/1967 | Petrik | 104/306 |
| 4,221,170 | A * | 9/1980 | Koudelka | 104/63 |
| 4,246,846 | A * | 1/1981 | Betschart | 104/69 |
| 5,081,740 | A * | 1/1992 | Smith | 16/42 R |
| 5,680,673 | A * | 10/1997 | Beshore | 16/42 R |
| 5,681,416 | A * | 10/1997 | Neumann et al. | 156/304.5 |
| 6,206,424 | B1* | 3/2001 | Edwards et al. | 280/845 |
| 6,901,629 | B2* | 6/2005 | Wurdack | 16/42 R |
| 8,015,663 | B2* | 9/2011 | Vorpahl | 16/42 R |
| 2005/0034268 | A1* | 2/2005 | Wurdack | 16/42 R |
| 2005/0081330 | A1* | 4/2005 | Edwards | 16/42 R |
| 2005/0183234 | A1* | 8/2005 | Bushey et al. | 16/42 R |
| 2007/0011845 | A1* | 1/2007 | Bushey et al. | 16/42 R |
| 2010/0329834 | A1* | 12/2010 | Coffy et al. | 414/800 |
| 2011/0191985 | A1* | 8/2011 | Hirth | 16/42 R |

* cited by examiner

*Primary Examiner* — Saul Rodriguez
*Assistant Examiner* — Brendan Tighe
(74) *Attorney, Agent, or Firm* — Coffy Law, LLC

(57) ABSTRACT

An apparatus and method for creating and utilizing a low friction structure is provided. The low friction apparatus (LFA) of the present embodiments allow for moving a load across a work surface with minimal effort. The LFA provides for easier movement over a transport surface area, wherein the impact of a large bearing area is minimized using minimal friction. The LFA is further adapted to greatly reduce the frictional force between a load and a work surface thereby allowing low surface stress on a work surface combined with ease of movement. In addition, the LFA provides low friction and subsequent ease of motion even while turning or moving sideways since its characteristics are non directional.

19 Claims, 3 Drawing Sheets

CUTAWAY VIEW OF LOW FRICTION APPARATUS (LFA) SURFACE CONFIGURATION

GENERAL LOW FRICTION APPARATUS (LFA) CONFIGURATION

CUTAWAY VIEW OF LOW FRICTION APPARATUS (LFA) SURFACE CONFIGURATION

GENERAL LOW FRICTION APPARATUS CAPTIVE WORK SURFACE CONFIGURATION

ALTERNATE SUPPORT BASE CONFIGURATIONS

ALTERNATE SUPPORT BASE CONFIGURATIONS

LOW FRICTION APPARATUS (LFA)

FIELD OF THE INVENTION

This invention relates to materials handling in general and, in particular, to a low friction structure for easier movement over a transport surface area.

BACKGROUND

Frozen water is known for its low friction properties. Most often, frozen water (e.g., snow) constitutes the low friction transport surface on a mountain side. At other times, the same frozen water in the form of ice constitutes the low friction transport surface in a skating setting. The low friction aspect of ice becomes the basis for skiing, sledding and many other winter sports. Ice has a high compressive strength but is generally not structurally stable by itself because it has a low tensile strength (about $\frac{1}{10}$ the compressive strength). Ice melts over 32° F. and yields continually under strain. Glaciers vividly demonstrate this.

SUMMARY

It would be desirable to capture the low friction aspect of ice without it being necessary to have the environment covered with ice or snow. Consequently, it would be possible to move objects, particularly heavy objects, without the normal frictional forces opposing such movement.

One embodiment provides a method for easier movement over a transport surface area, wherein the surface stress is lowered, comprising: placing strategically a plurality of structures under the load thereby allowing the load to be moved with minimal effort; and moving said load across a surface area wherein resistance to movement is minimized and induced stress is lowered across the transport surface area.

Yet another embodiment provides an apparatus adapted to greatly reduce the frictional force between a load and a work surface thereby allowing low surface stress on a work surface combined with ease of movement, comprising: a support base that engages the load; and a chamber housing a low friction material coupled to the support base thereby inducing low stress on the work surface.

BRIEF DESCRIPTION OF THE DRAWINGS

The teachings of the present embodiments can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present embodiments are primarily described within the context of a Low Friction Apparatus (LFA) and a method for easier movement over a transport surface area, wherein resistance to movement is minimized using minimal friction. However, those skilled in the art and informed by the teachings herein will realize that the invention is also applicable to other technical areas and/or embodiments.

Figure 1:
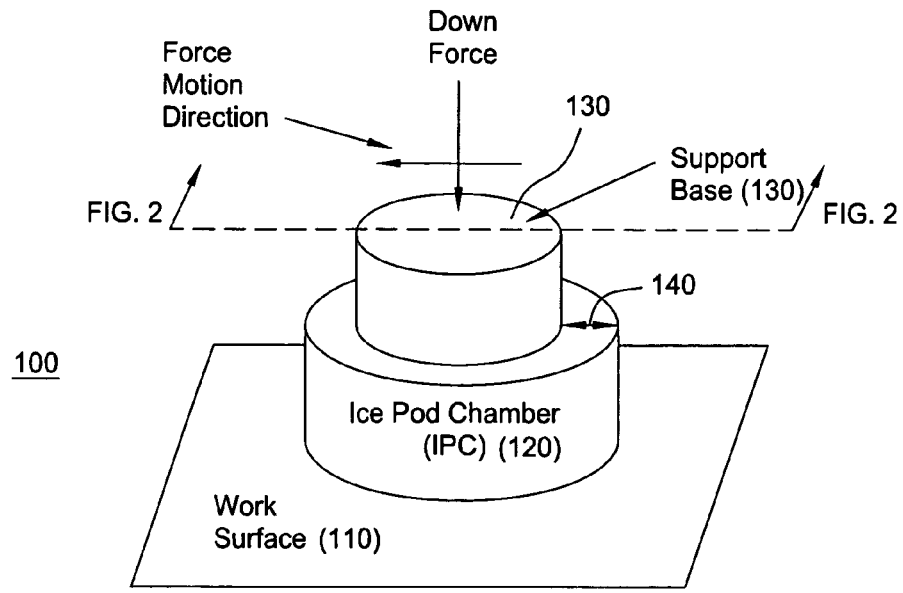
FIG. 1 illustratively depicts a Low Friction Apparatus (LFA) according to one embodiment.

FIG. 1 illustratively depicts a general Low friction Apparatus (LFA) disclosed herein. Specifically, Low friction Apparatus (LFA) 100 comprises Ice Pod Chamber (IPC) 120, a support base 130. Ice Pod Chamber (IPC) 120 is generally circular since this allows non-directional characteristics for any direction of motion.

Figure 3:
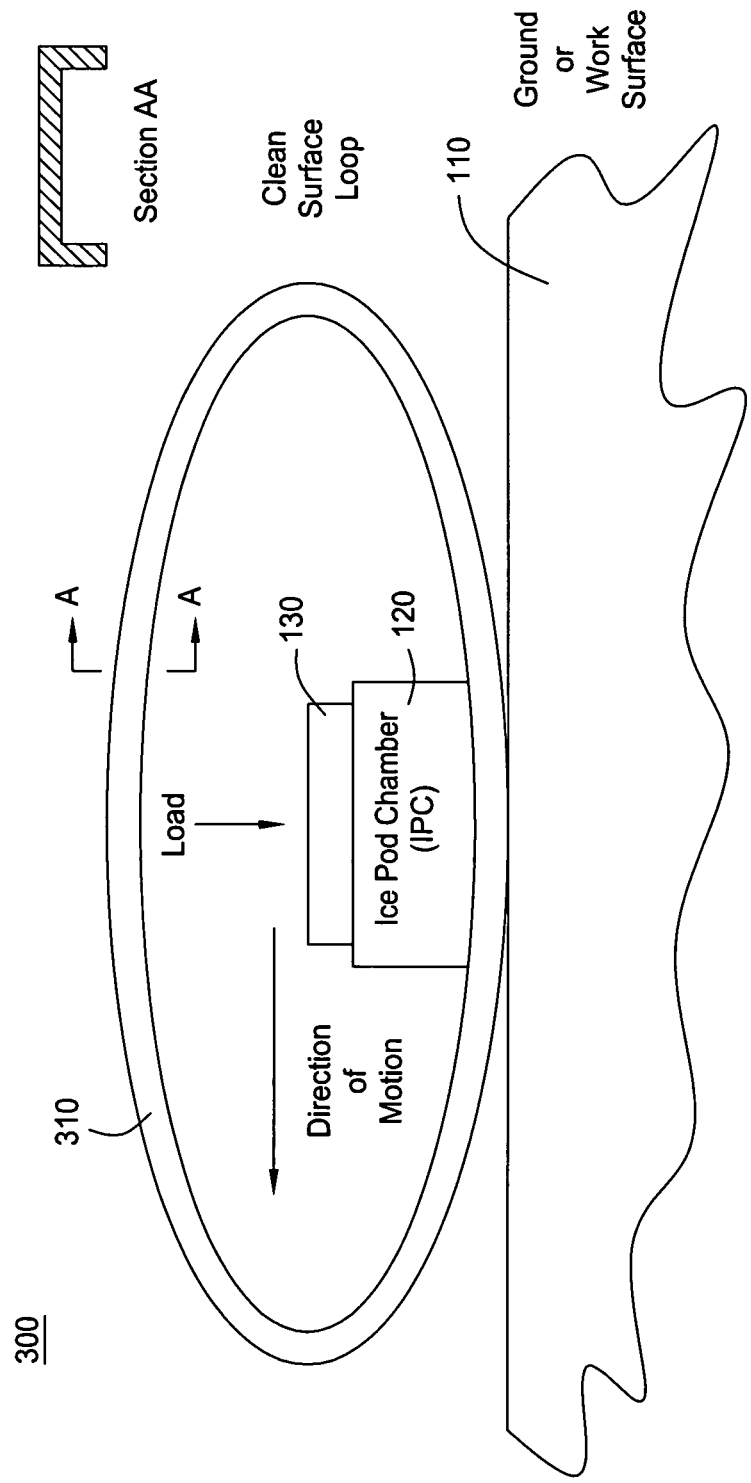
FIG. 3 illustratively depicts a general Low Friction Apparatus (LFA) captive work surface configuration according to one embodiment.

In another embodiment, a shoe (rectangular) shape in the 'track' or captive work surface version as shown in FIG. 3 is used. This would be primarily because the LFA would only move in one direction relative to the captive surface or 'track' configuration. IPC 120 is a structure that houses a low friction material.

The embodiments described herein may selectively replace glides as a material conveyance and handling, but also wheels and bearings in certain applications. For example, using a small handlift truck for comparative purposes, wherein one of the wheels might have a solid rubber tread 8 inches in diameter with a 1¾ inch width tread. We may reasonably conclude that the contact patch at the base of the wheel under a 100 pound load is on order of 1 inch squared. The stress under the contact patch area is therefore, at least 100 pounds/1 in squared=100 psi. The term 'at least' is used because no tread pattern was assumed. If there were a tread pattern, the reduced contact area to form the tread pattern would have to be accounted for.

An 8 inch diameter IPC (same size as the previous example wheel) would have a contact area of $\pi D^2/4$ (area of a circle) equal to about 50 inches squared ($in^2$). The resultant stress under the same 100 pound load is therefore, 100 pounds/50 inches squared=2 psi. The possible benefits of reducing the contact area stress from 100 psi to 2 psi can immediately be seen. The IPC can be sized to keep surface stress safely below the yield stress of the working surface, in this case as low as 2 psi. If the same basic wheel design were kept but 'sized up' to reduce the design stress under a 100 pound load from 100 psi to 2 psi (keeping all dimensions in the same proportion) the resultant wheel would require a contact patch of 50 inches squared (since the original contact patch was 1 inch squared). The contact patch is two dimensional so we take the square root of 50 to find the multiplier. Taking the square root of 50 yields ~7. Thus the dimensions of the wheel are multiplied by a factor of 7. The tread width would thus be 7×1¾=12.25 inches and the diameter would be 8×7=56 inches. A handlift truck with such oversized wheels (56 in.×12.25 in.) would be extremely cumbersome and of little utility. In addition, the IPC provides low friction and subsequent ease of motion even while turning or moving sideways since its characteristics are non directional. The wheel, conversely, provides ease of motion in only one direction, generates large stresses when moved sideways and increases surface stresses when turning. Thus, the present embodiments not only allow low frictional ease of movement, but also allow control of the surface handling stresses and therefore, eliminate elaborate material handling provisions in certain intermittent material handling situations or places where wheeled conveyance devices, tracked or untracked bearings, overhead hoists etc. are limited in space access or other physical constraint.

Figure 2:
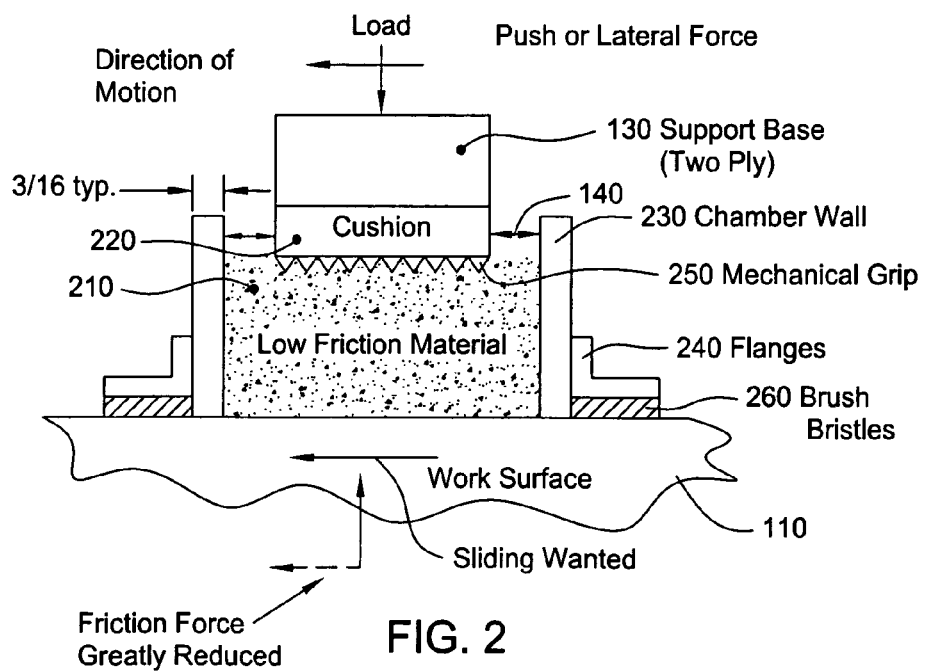
FIG. 2 graphically depicts a cutaway view of Low Friction Apparatus (LFA) surface configuration according to one embodiment.

FIG. 2 graphically depicts a cutaway view of Low Friction Apparatus (LFA) surface configuration. In one embodiment, low friction material 210 is ice. In other embodiment, other solid lubricant forms may be employed. Lubricants such as hard soap and hard wax block may be used. The deciding factor in determining the type of lubricants to use is that the coefficient of sliding friction multiplied by the load [(coefficient of sliding friction)×(load)] be lower than mechanical grip 250.

Mechanical grip 250, which is a cushioning material or buffer prevents sliding of support base 130 relative to the low friction material. In one embodiment, mechanical grip 250 is a coarse woven material with random thread pattern providing enough mechanical grip. In another embodiment, the material is fiber cross-hair attached to the cushion. This fiber matrix tends to keep the low friction material moving in the desired direction of motion rather than allowing the support base to push on chamber walls 230. In other embodiment, for heavy load applications carbide chips may be suitable. The function of the chamber wall is primarily to contain the low friction material within the perimeter of the chamber so that the low friction material can direct the force from the support base to the work surface or transport surface area. Ideally, there should be no lateral force transmitted from the support base to the chamber wall.

Chamber wall 230 is made of material such as polyvinylchloride (PVC) plastic pipe in one embodiment. The material is chosen to both absorb any lateral pressure and provide an environment conducive to preserving the low friction material. In another embodiment, the material is made of steel or other hardened structure. In yet another embodiment, chamber wall 230 may be made of composite material. In a further embodiment, chamber wall 230 may contain filler material, which is used to achieve a specific quality.

Generally speaking, any material capable of housing the low friction material may implement the various embodiments described herein. While PVC is generally discussed within the context of the description, the use of any other structural material is considered to be within the scope of the present embodiments.

Support base 130 adheres to cushion 220, which terminates with irregularly shaped mechanical grip 250. Consequently, the interface of the support base and the low friction material is such that the support base is not free to slide on top of the low friction material, but grips the low friction material mechanically with sufficient surface porosity, mechanical projections or 'tread' pattern. Ice pod Chamber works best when grip of support base on the low friction material is greater than the friction of low friction material on the work surface. Support base 130 must be of sufficient thickness for the load.

Ice Pod Chamber 120 further comprises at least two (2) devices in order to minimize contaminants from penetrating in the chamber. In one embodiment, these devices are flanges 240 terminated with brush bristles 260. In other embodiment, these devices comprise an apparatus capable of effectively blocking a greater portion of contaminants from penetrating the chamber.

Distance 140 is desirable with proper grip; sliding of the support base is to be minimized. Support base 130 will slide without proper grip. This result is unwanted because it would cause the support base to push on the chamber wall and increase friction at the interface of the work surface.

FIG. 3 illustratively depicts a general Low Friction Apparatus (LFA) captive work surface configuration. Surface 310 is a captive work surface. In one embodiment, this surface is a skating setting. In another embodiment, the surface area is a skiing slope. Yet, in another embodiment, the surface is a specially constructed surface.

Figure 4:
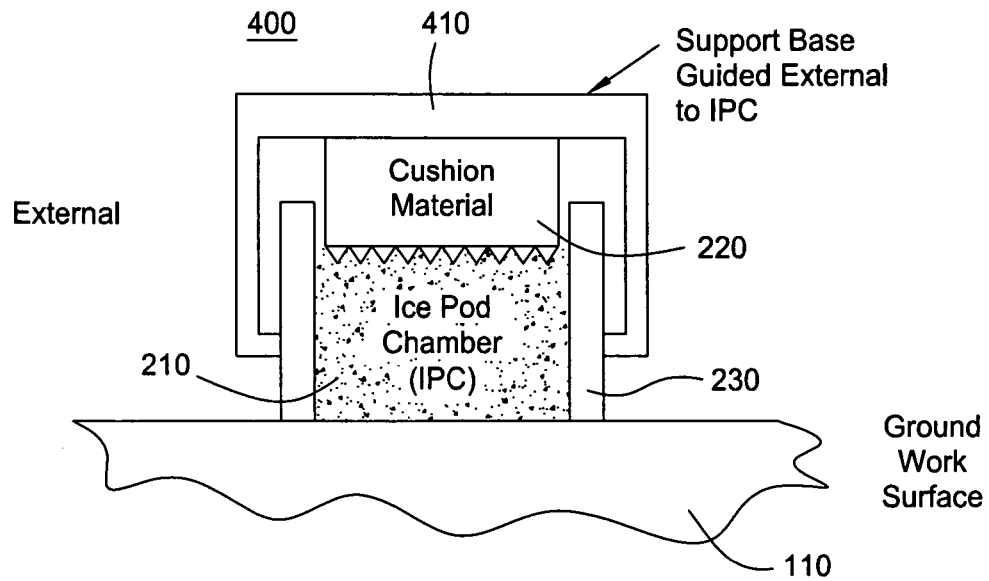
FIG. 4 illustratively depicts an alternate support base configuration according to one embodiment.
Figure 5:
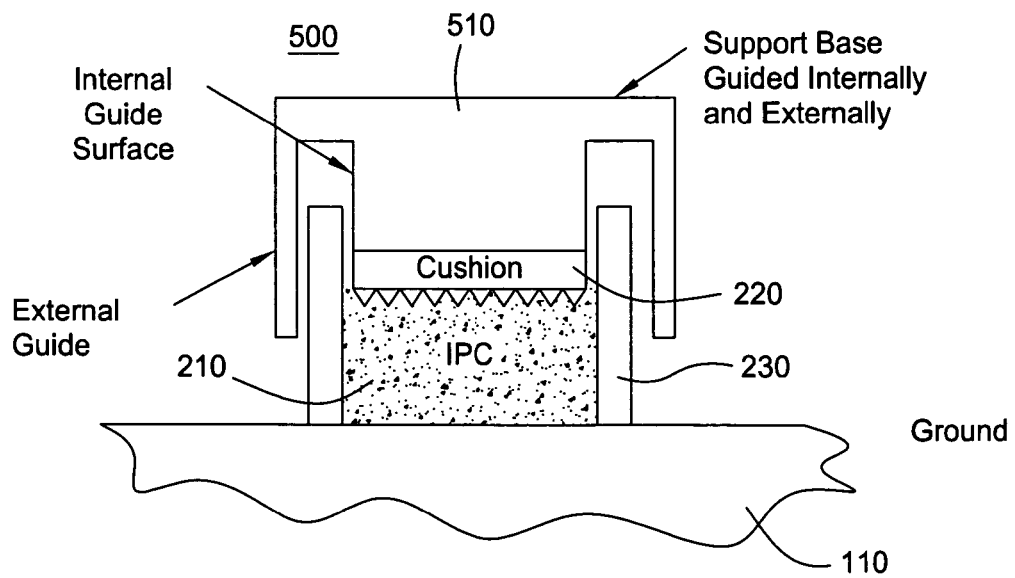
FIG. 5 illustratively depicts an alternate support base configuration according to one embodiment.

FIG. 4 illustratively depicts an alternate support base configuration. Support base 410 is constructed such that it can be guided externally. In another embodiment, the support base is constructed such that it can be both externally and internally guided. FIG. 5 depicts such embodiment.

While the foregoing is directed to various embodiments of the present invention, other and further embodiments of the invention may be devised without departing from the basic scope thereof. Thus, the invention should not be limited to use solely in any specific application identified and/or implied by such illustration. As such, the appropriate scope of the invention is to be determined according to the claims, which follow.

We claim:

1. An apparatus, comprising:
    a support base portion proximate a cushion section, the support base portion configured to provide a resting place for an applied load;
    a buffer portion including the cushion section interfacing the load with a low friction material; and
    a chamber for housing the support base portion and the buffer portion, said chamber forming a lateral support structure in a containment configuration for the low friction material under the applied load.

2. The apparatus of claim 1, wherein the buffer portion comprises a mechanical grip, which reduces shock transmitted to the low friction material.

3. The apparatus of claim 1, further comprising a device for minimizing contaminants entering the structure during tangential movement.

4. The apparatus of claim 1, wherein the low friction and low induced stress material is ice.

5. The apparatus of claim 1, wherein the chamber is an ice pod chamber (IPC).

6. The apparatus of claim 3, wherein the device further comprises flanges and brush bristles.

7. The apparatus of claim 1, further allowing force to be transmitted to the work surface, while the frictional component of force in the direction of movement is constrained.

8. The apparatus of claim 1, wherein the support base portion directs the force generated by said load thereby providing for easier movement over a transport surface area.

9. The apparatus of claim 1, wherein a work surface is a captive work surface.

10. The apparatus of claim 1, wherein the support base portion is guided externally.

11. The apparatus of claim 1, wherein the support base portion is guided both internally and externally.

12. The apparatus of claim 1, wherein the buffer portion comprises an arrangement allowing for optimum grip to ice.

13. The apparatus of claim 1, wherein a lateral force transmitted from the support base portion to the walls of the ice pod chamber (IPC) is constrained.

14. The apparatus of claim 2, wherein the support base portion is not free to slide on top of the low friction material, but grips the low friction material mechanically with perimeter mechanical restraint, sufficient surface porosity, mechanical projections 'tread' pattern or combination thereof.

15. A method for easier movement over a transport surface area, comprising:
    placing a plurality of apparatuses of claim 1 under a load; and
    applying a force to the load in a direction of movement.

16. The method of claim 15, wherein the low friction and low induced stress material is ice.

17. An apparatus for moving an article over a transport surface area, wherein the surface stress is lowered, the apparatus comprising:
- means for providing a resting place for an applied load;
- means for interfacing the applied load to a low friction material; and
- means for housing a support base portion and a buffer portion and for forming a lateral support structure in a containment configuration for the low friction material under the applied load.

18. The apparatus of claim 4, wherein ice comprises frozen material composed mainly of water ($H_2O$).

19. The apparatus of claim 1, further allowing the ice to slide unencumbered along the load bearing floor or work surface while the applied load maintains its positional integrity.

* * * * *